United States Patent
Rodniansky et al.

(10) Patent No.: US 10,614,237 B2
(45) Date of Patent: Apr. 7, 2020

(54) RESOURCE-FREE PRIORITIZING IN HIGH AVAILABILITY EXTERNAL SECURITY SYSTEMS

(71) Applicant: International Business Machines Corporation, Armonk, NY (US)

(72) Inventors: Leonid Rodniansky, Allston, MA (US); Vladislav Langman, Acton, MA (US); Tania Butovsky, Needham, MA (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 15/808,963

(22) Filed: Nov. 10, 2017

(65) Prior Publication Data

US 2019/0147180 A1    May 16, 2019

(51) Int. Cl.
| H04L 29/06 | (2006.01) |
| G06F 21/62 | (2013.01) |
| G06F 16/903 | (2019.01) |

(52) U.S. Cl.
CPC ........ G06F 21/6218 (2013.01); H04L 63/105 (2013.01); *G06F 16/90335* (2019.01); *H04L 63/1416* (2013.01); *H04L 63/1458* (2013.01)

(58) Field of Classification Search
CPC ..... H04L 63/10; H04L 63/14; H04L 63/1441; H04L 63/1458; G06F 21/60; G06F 21/62; G06F 21/6218; G06F 16/90335
See application file for complete search history.

(56) References Cited

U.S. PATENT DOCUMENTS

| 6,469,993 | B1 * | 10/2002 | Seo ................... | H04W 72/1247 370/230 |
| 2011/0276699 | A1 * | 11/2011 | Pedersen ................. | H04L 45/24 709/227 |
| 2011/0314145 | A1 * | 12/2011 | Raleigh ................... | H04L 12/14 709/224 |
| 2013/0077486 | A1 * | 3/2013 | Keith .................. | H04L 47/2433 370/230.1 |
| 2014/0215598 | A1 * | 7/2014 | Ke ...................... | H04L 63/0272 726/12 |
| 2014/0237538 | A1 * | 8/2014 | Rodniansky ............ | H04L 63/20 726/1 |
| 2014/0369203 | A1 * | 12/2014 | Luo ................... | H04W 28/0226 370/235 |

(Continued)

*Primary Examiner* — Khang Do
(74) *Attorney, Agent, or Firm* — Jeffrey S. LaBaw; David H. Judson (57) ABSTRACT

A database access control system is augmented to provide additional functionality to enable an external security device (e.g., an EDSM) to fully and accurately assess a database query against one or more security policies even when the EDSM is overloaded. To this end, a pair of channels is established between the ISA and the ESM, wherein the channel pair includes a first channel that is expected to have relatively low packet rate, and a second channel that is expected to have a relatively high packet rate. Packets representing initial session information (i.e., user information sent at the beginning of a user session) are directed to the first channel, whereas packets received following session establishment are directed to the second channel, because the latter are likely to be present during a potential overload scenario.

19 Claims, 3 Drawing Sheets

(56) References Cited

U.S. PATENT DOCUMENTS

| | | |
|---|---|---|
| 2015/0089080 A1 | 3/2015 | Alsup |
| 2015/0381739 A1* | 12/2015 | Chai .................. H04L 63/0892 |
| | | 726/7 |
| 2016/0021150 A1* | 1/2016 | Larkin ................ H04L 65/1016 |
| | | 709/225 |
| 2016/0182383 A1 | 6/2016 | Pedersen |
| 2017/0019426 A1* | 1/2017 | Hayes .................. H04L 63/205 |
| 2017/0104684 A1 | 4/2017 | Seeley et al. |
| 2017/0118249 A1* | 4/2017 | Motukuru .............. H04L 63/20 |

* cited by examiner

RESOURCE-FREE PRIORITIZING IN HIGH AVAILABILITY EXTERNAL SECURITY SYSTEMS

BACKGROUND OF THE INVENTION

Technical Field

This disclosure relates generally to securing resources in a distributed computing environment and, in particular, to database access security.

Background of the Related Art

Protecting a database using network-based intrusion detection is well-known.

Systems of this type analyze database access attempts prior to transport into a host computer system and accordingly, mitigate resource overhead. Host computer systems, however, often employ local access. Because monitoring access attempts via the network monitor may not encompass such local access attempts, it is also known to provide a data security device that intercepts both local and remote access attempts to the database.

A data security device of this type typically monitors all database access attempts for auditing and security analysis. In operation, the data security device receives local access transactions via a local agent on the host. Typically, the local agent identifies and integrates with an inter-process communication (IPC) mechanism on the host computer system. Using an IPC interception mechanism (or, in an alternative, cryptographic method invocation or the like), the local agent directs local database access attempts to the local agent (sometimes known as an "intercepting server agent" (ISA), which then forwards the intercepted attempts to the data security device for further analysis. The data security device typically is remote from the database host and thus is sometimes referred to as an "external security device" (or "ESD"), or "external-to-database non-intrusive security mechanism (or "EDSM"). An EDSM observes local access attempts via interception and transmission to the device, thereby consolidating analysis and logging of the data access attempts. An EDSM typically includes a database protocol analyzing module, a query parsing module, a security policy validation module, and an alert module. The core function of the EDSM is to extract a database query that is sent by a database client application to the database server from the database protocol packets that are intercepted by the agent, parse this query up to a database object level, validate the query against one or more security policies for a potential database object access violation, and issue an appropriate alert if an access violation is detected. A commercial product that provides this local database access control system (LDACS) functionality is IBM® InfoSphere® Guardium®.

While this type of processing provides significant advantages, in practice requests and responses can overload local agent or the external security device (or both). Such overload can compromise the EDSM stability. When an overload condition continues over a long period, a loss of packets in internal ISA or ESM buffers can occur, which creates a potential security problem because EDSM is required to be a highly-available system.

Thus, there remains a need in the art for an efficient and reliable way to manage EDSM operations when the EDSM is overloaded by incoming packets. The technique of this disclosure addresses this need.

BRIEF SUMMARY

A database access control system is augmented according to this disclosure to provide additional functionality to enable the external security device (e.g., an EDSM) to fully and accurately assess a database query against one or more security policies even when the ESM is overloaded (or otherwise experiencing a potential overload situation). To this end, a pair of logical channels is established between the ISA and the ESM, wherein the channel pair includes a first channel that is expected to have relatively low packet rate but is delivered at a high priority, and a second channel that is expected to have a relatively high packet rate and that can be delivered at a priority that is relatively lower than the priority of the first channel. Internally, the ISA is configured to direct certain packets to the first channel, and to direct other packets to the second channel. According to this disclosure, packets comprising session user session information (i.e., user information sent at the beginning of a user session) are directed to the first channel, whereas packets received following session establishment are directed to the second channel, because the latter are more likely to be present during a potential overload scenario. In other words, the dual channel technique of this disclosure exploits the fact that the rate of traffic intercepted by the ISA (and directed to the ESM) varies as a function of whether the traffic represents the session user information (which only occurs infrequently and thus has a relatively low rate but needs to be at a high priority), versus traffic that represents typical session information (which occurs frequently during the session) following session establishment. By routing the initial session setup information over the first channel, and by ensuring that the first channel is a high priority, low rate channel and thus highly available, the ESM remains able to perform its basic functions even in an overload scenario where significant traffic spikes are experienced over the second channel.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
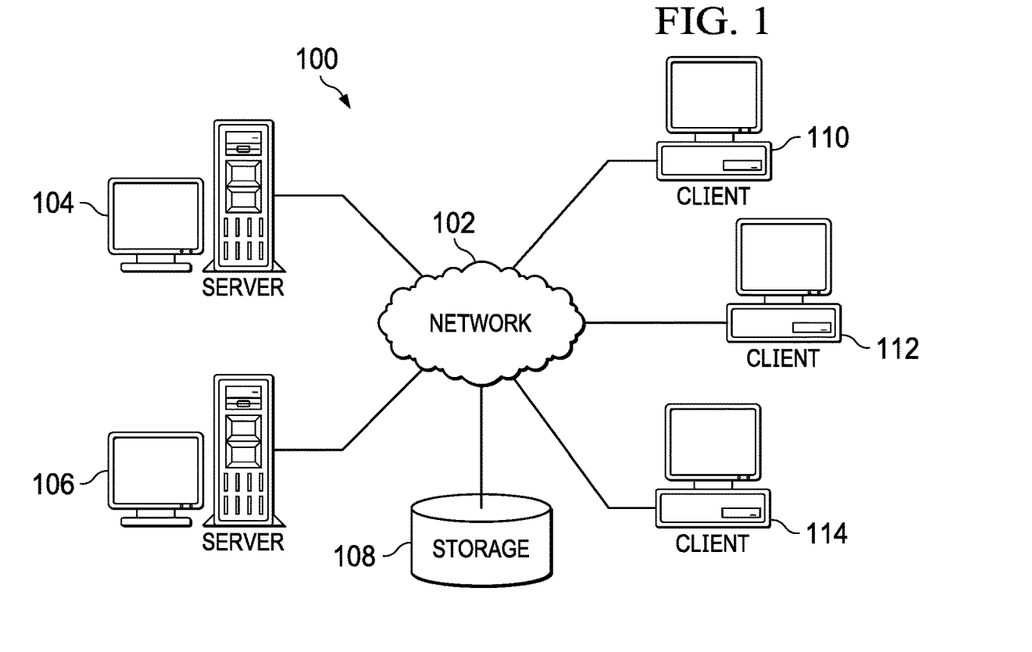
FIG. 1 depicts an exemplary block diagram of a distributed data processing environment in which exemplary aspects of the illustrative embodiments may be implemented.
Figure 2:
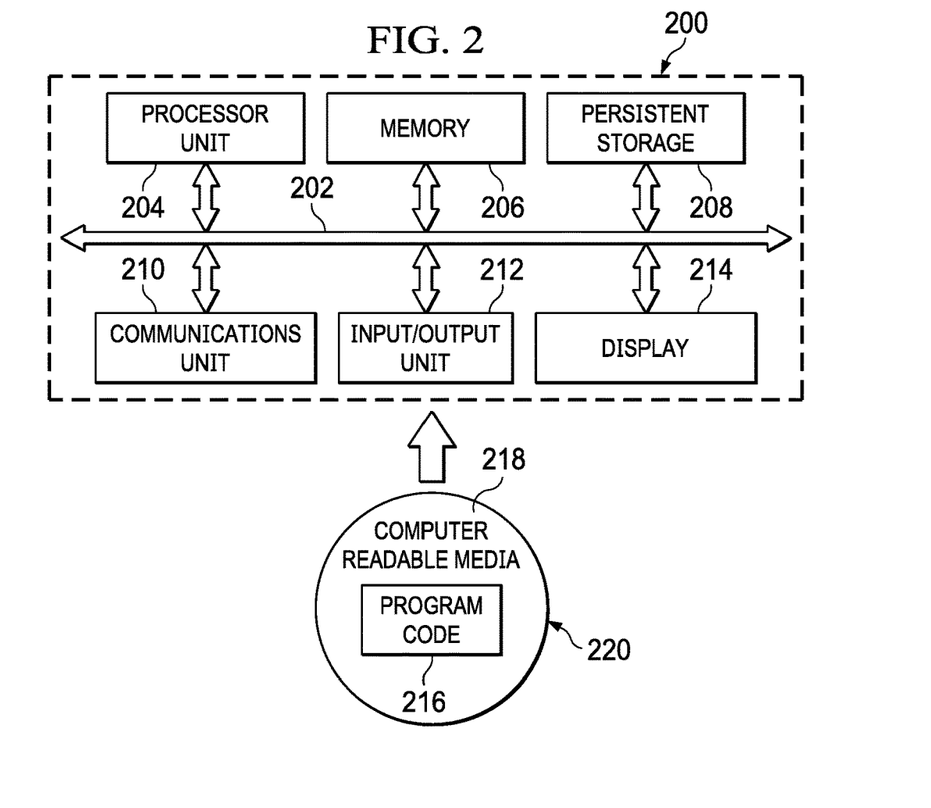
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

In a representative but non-limiting implementation, the techniques herein are described in the context of a transaction-processing system or environment that comprises distributed and mainframe components, working cooperatively to respond to HTTP and Web Service client end-user service or transaction requests. Such a system or environment typically comprises multiple components, configured in a distributed manner. A distributed component of a larger multi-component transaction-processing environment typically comprises at least a computer, operating system platform, applications, networking and an associated security engine that provides distributed transaction processing functions, such as networking interactions with the client end-user, and identification and authentication functions in HTTP and Web Services scenarios. The transaction-processing system or environment of this type typically also includes a mainframe component that includes at least a computer, operating system platform, applications, networking and associated security engine that provides high performance back-end transaction processing and large database functionality.

Local Database Access Control

Auditing and logging operations, as well as highly security-sensitive applications, expect coverage of all local and remote access attempts. To this end, and as described above, it is known in the prior art to enhance conventional network-based intrusion detection and monitoring by intercepting local access attempts in addition to the database access attempts occurring via the network. A Local Database Access Control System (LDACS) provides this functionality. In this approach, typically an IPC intercept is defined to identify an access point common to local and remote DB access attempts. Local access attempts to the database are intercepted and transported to a data security device operable for network monitoring of the access attempts. Because the data security device is remote, it is sometimes referred to herein as an "external security device" (or "ESD"), or "external-to-database non-intrusive security mechanism ("EDSM"). The IPC intercept performs interception of the local access attempts through a minimal footprint implementation object to mitigate resource overhead. In this manner, the remote network data security device observes both the local access attempts via interception at the DB host and transmission of the intercepted access attempts to the data security device, and the remote access attempts via the network, thereby consolidating analysis and logging of the data access attempts to the database resource via the data security device.

Figure 3:
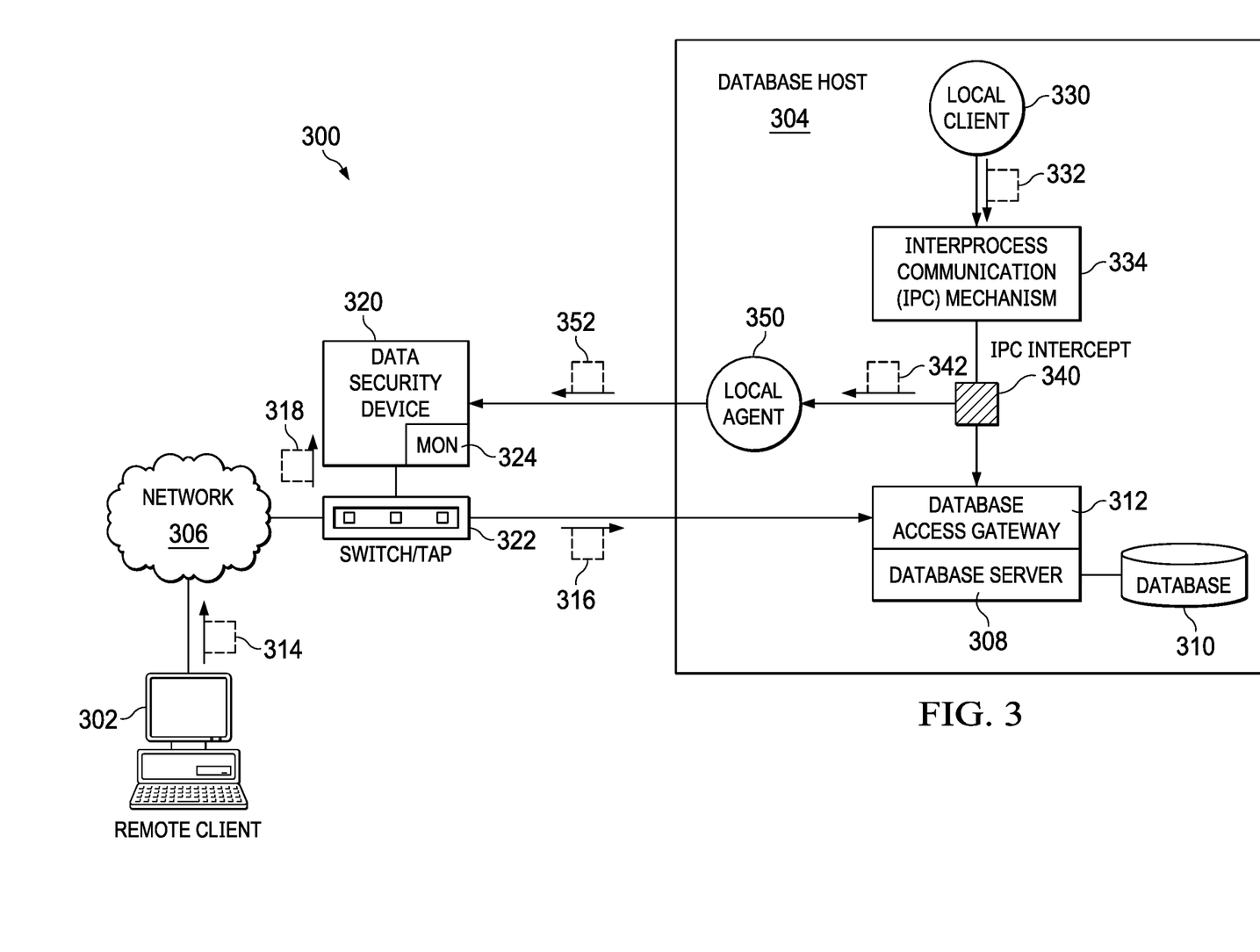
FIG. 3 depicts the high level operation of a known Local Database Access Control System (LDACS)

FIG. 3 illustrates this basic operation in more detail. Referring to FIG. 3, the environment 300 provides a remote user 302 with a database (DB) host 304 for data storage and retrieval operations (DB operations). The user 302 connects to the host 304 via an access network 306, which may be any suitable internetworking infrastructure such as a LAN, intranet, extranet or the Internet. The DB host 304 includes a database server 308 connected to the database 310, typically a disk array or set of mass storage devices such as disk drives. The database 308 includes a DB access gateway 312, which operates as an application programming interface (API) for user 302 access via a variety of access methods.

A user initiates access to the database in the form of a user request 314, which passes through the network 306 for delivery to the DB access gateway 312 as an incoming request 316. A data security device 320 is connected via a switch e22 or other connectivity device such as a tap, router or bridge, on the path from the network 306 to the host 304. The data security device 320 includes a DB monitor 324 for receiving user requests 314 sent through the switch 322. The DB monitor receives and analyzes the incoming user request 314 as a tapped access attempt 318, which the DB monitor 324 analyzes according to a predetermined security or access policy. The data security device 320 then passes the tapped access attempt 318 to the access gateway (AG) 312 as an incoming request 116.

Typically, the database server 308 expects a substantial portion of DB traffic (user requests 314) to arrive remotely via the network 306, and thus pass scrutiny under the data security device 320. However, a portion of database access attempts emanate locally from a local client 330, executing on the host 304, as local access attempts 332. The local access attempts 332 arrive at the access gateway 312 via an Inter-Process Communication (IPC) mechanism 334. Such local access attempts 332 do not pass through the switch 322, and therefore may otherwise be operable to elude scrutiny of the data security device 320. To address this concern, a known LDACS solution employs an IPC intercept 340 for intercepting the local access attempt 332 and transporting the intercepted access attempt 342 to a local agent 350. The local agent 350 determines, by interrogating the IPC mechanism 334, a database instruction 352 corresponding to the local access attempts 332. The local agent 350 then transmits the determined database instruction 352 to the data security device 320 for analysis and further operations by the DB monitor 324. In this manner, the data security device 320 receives all local and remote access attempts to the DB server 308 to more fully analyze, monitor, and guard against access attempts that may be undesirable. Although the above-described configuration is preferred, the agent 350 need not be local, but rather may be positioned in other locations or configurations associated with a database host or system.

In a typical DB host 304, the local client 330 may employ a variety of IPC mechanisms 334 to transmit local access attempt 332 to the DB server 308. IPC typically is not secure. Alternate configurations may employ other communication mechanisms, such as cryptographic remote method invocation.

Figure 4:
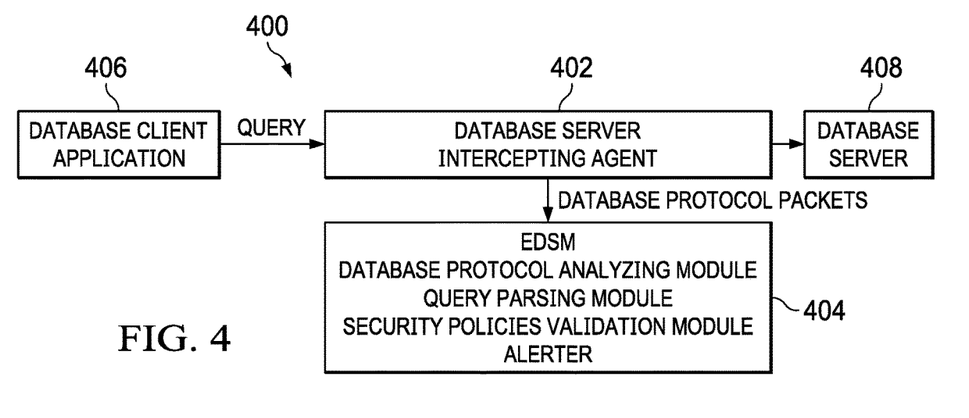
FIG. 4 is a process flow diagram illustrating the known operation of database access control of FIG. 3.

FIG. 4 depicts the basic operation of a database access control system 400 that comprises the database server intercepting agent 402 and an associated EDSM 404. As shown, the agent 402 is situated in-line between the database client application 406, and the database server 408. Queries initiated to the database server 408 by the database client application 406 are intercepted by agent 402 (sometimes referred to as an Intercepting Server Agent (ISA)), and database protocol packets comprising those queries are forwarded to the EDSM 408 for evaluation. Typically, and as used herein, a database protocol packet refers to a formatted unit of data used in communication between the database client application and the database server. As is known, EDSM 408 typically includes several modules, e.g., a database protocol analyzing module, a query parsing module, a security policy validation module, and an alerting module. These modules typically are implemented as software executing in hardware. The core function of the EDSM is to extract the database query that is sent by the database client application 406 to the database server 408 and intercepted by the agent 402, parse this query up to a database object level, validate it (for potential database object access violations) against one of more EDSM security policies. If an access violation is detected, the EDSM issues an alert to this effect, or takes some other notification, mitigation or remediation function.

Typically, the ISA communicates with the ESM via TCP/IP and in a secure (i.e., encrypted) manner. The ESM receives connections from the ISA on a given physical port. Preferably, the ESM includes a queue that receives (for processing with the ESM) requests sent from the ISA.

As described above, however, there may be circumstances in which the number of requests and responses being examined and processed by the EDSM can overload the local agent or the external security device (or both). Such overload can compromise the EDSM stability. When an overload condition continues over a long period, a loss of packets in internal ISA or ESM buffers can occur, which creates a potential security problem because EDSM is required to be a highly-available system.

The problem of what to do when the EDSM (typically the ESM component) is operating under a potential or actual overload situation is addressed and solved by the subject matter of this disclosure, which is now described.

Resource-Free Prioritizing in High Availability External Security Systems

According to this disclosure, a database access control system such as depicted in FIG. 4 is augmented to provide additional functionality to enable the external security device (e.g., an EDSM) to fully and accurately assess a database query against one or more security policies, even when the ESM component is operating in an overload situation (i.e., requests and responses that are flowing are overloading the ISA or ESM, or both). This enhanced operation is depicted in the solution shown in FIG. 5. As depicted there, client applications 500 send network or local protocol packets to the server 502 that executes the ISA. In a typical operation, and as has been described above, the ISA sends those packets to the ESM 504. As also described, the ESM 504 typically includes a protocol analyzing module, a parsing module, and a security policy validation module.

Figure 5:
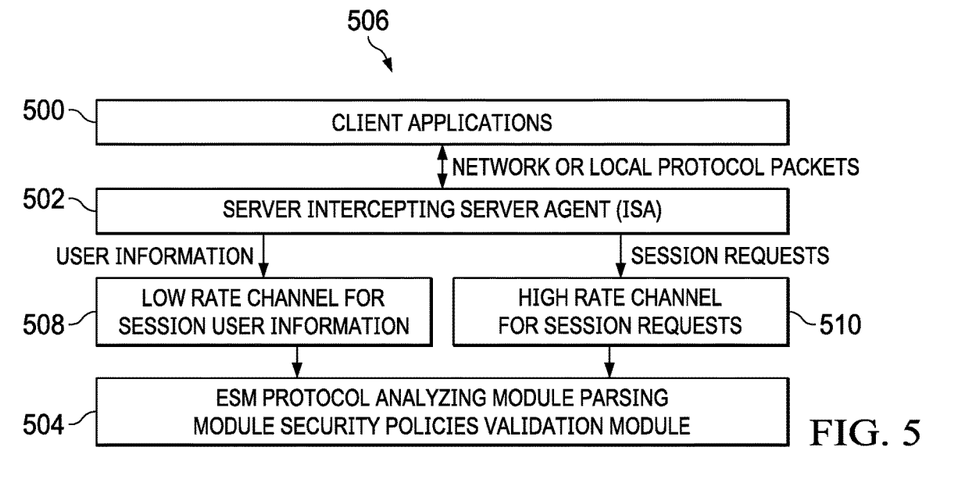
FIG. 5 depicts a preferred technique of this disclosure whereby a pair of different priority logical channels are established between the ISA and ESM.

According to this disclosure, and as depicted, a pair of channels 506 is established and maintained between the ISA and the ESM, wherein the channel pair includes a first channel 508 that is expected to have relatively low packet rate but high priority, and a second channel 510 that is expected to have a relatively high packet rate but low priority. The channels 508 and 510 typically are logical channels. To this end, internally the ISA is configured to direct certain packets to the first channel 508 (e.g., by marking or otherwise tagging packets intended for the first channel with a first flag), and to direct other packets to the second channel 510 (e.g., by marking or otherwise tagging packets intended for the second channel with a second flag). The nature of the marking or tagging by the ISA may vary depending on implementation, and it may only be necessary to mark or tag the data packets that are to be delivered over the first channel, as those are the packets that are deemed to be high priority and that are not expected to occur often (such that the low packet rate of the channel is appropriate). In other words, the marking may simply be the presence or absence of an indicator associated with a data packet.

According to this disclosure, preferably only the packets containing session user information then are directed to the first channel 508, whereas follow-on packets received (i.e., those following session establishment) are directed to the second channel 510. The session user information is prioritized in this manner because, when such information is lost, the security of any follow-on session request(s) (that are not lost) cannot be successfully validated, and thus it will not be clear whether the session user is allowed to issue such follow-on request(s). By default, and once the ISA determines that a new session is being initiated using the session user information, a given number of packets (e.g., twenty (20), although the number may be varied) are then routed to the first channel 508, e.g., by being flagged in the manner described. After the ISA delivers/routes the default number of packets over the first channel, packets thereafter associated with the same session are directed by the ISA over the second channel 510.

The dual channel technique of this disclosure exploits the fact that the rate of traffic intercepted by the ISA (and directed to the ESM) typically varies as a function of whether the traffic represents the session user information (which only occurs infrequently and thus has a relatively low rate but needs to be afforded high priority), versus traffic that represents typical session request information (which occurs frequently during the session and can be safely afforded a lower priority as compared to the user session information) following session establishment. By routing the initial session setup information over the first channel, and by ensuring that the first channel is a low rate, high priority channel and thus highly available, the ESM remains able to perform its basic functions even in an overload scenario where significant traffic spikes are experienced over the second channel, which in comparison to the first channel has a higher rate but lower priority.

The designation of "first" or "second," as well as the description of "low" or "high" rate, or "low" or "high" priority, are merely for descriptive purposes, and these designations do not necessarily imply or require absolute values or properties or characteristics.

Figure 6:
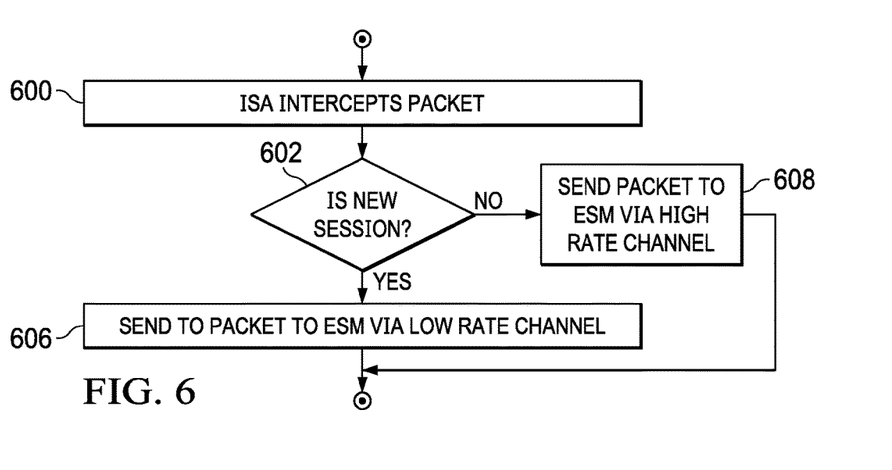
FIG. 6 depicts a process flow depicting how the ISA routes data packets according to an embodiment of this disclosure.

FIG. 6 depicts a preferred operation of the ISA. In this example embodiment, it is assumed that the ESM is configured with first and second queues, wherein the first queue is configured to receive packets delivered over the first channel, and wherein the second queue is configured to receive packets delivered over the second channel. The routine begins at step 600 when the ISA intercepts a packet. At step 602, a test is performed to determine whether the packet represents session user information (e.g., associated with initiation of a new session). If the outcome of the test at step 602 indicates that the packet comprises the session user information (or otherwise represents information that the system considers important to session initiation), the ISA tags the packet as high priority and, at step 606, sends the tagged packet to the ESM via the first (high priority, low rate) channel. If, however, the outcome of the test at step 602 indicates that the packet does not represent session user information (and, as noted above, typically packets received after a given number (e.g., 20) of packets representing the new session have been received and processed), the ISA tags the packet as low priority (or does not tag/mark it at all) and, at step 608, sends the packet to the ESM via the second (lower priority, high rate) channel.

Preferably, the ISA is a lightweight process that resides on the database server host. The ISA intercepts connection events when a client makes a new connection to the server. Except perhaps to include the packet marking function, its function remains unchanged. The ESM as noted is augmented to include queues corresponding to the logical channels. The technique herein maximizes EDSM stability even during an overload situation by leveraging two assumptions, namely, that session user information sent at the beginning of each session is highly important for security validation (because if user information is missed or lost due to the overload, then all following session requests cannot be validated), and that session user information is sent relatively rarely as compared to the follow-on requests that are sent after the session is established. By creating and exploiting the two separate logical channels for packets sent from the ISA to the ESM, the system ensures that the session user information (with its relatively low rate of occurrence) can be acted on by the ESM, while the session request information (with its relatively high rate of occurrence)—even if lost due to the overload condition—does not impair the overall availability, reliability and stability of the EDSM security operations. The approach does not require any special packet analysis on the ISA side, as the ISA can distinguish the user session information. As described, the ISA simply needs to redirect a configurable number of the first packets of every new session to its high priority, low rate channel, and then redirect the follow-on session packets to its lower priority, high rate channel. The ESM prioritizes the low rate channel to ensure that the packets comprising the session user information are processed irrespective of the overload conditions. Stated another way, the EDSM stability is maximized because the session user information is not lost even if the high rate channel is overloaded by incoming requests.

Thus, for example, suppose the server simultaneously opens 1000 sessions with an incoming rate of 1000 packets/second. Assume now that the ISA detects when the new session is opened (in its usual manner) and (over the first second) forwards only the first 10 session packets (namely, those packets containing session user information) to the high priority low rate channel, while the remaining 990 packets travel over the lower priority high rate channel. Thus, the low rate channel then serves 1000*10=10,000 packets, while the high rate channel servers 1000*990=990,000 packets during one second. The ratio between the low rate and high rate channels in this example is approximately 100, although this is not a limitation. This bifurcated approach assures that the most important security information is not lost even in the event of an overload condition, e.g., when the EDSM is unable to serve 1000*1000=1,000,000 packets per second. Moreover, the approach herein does not create any performance impact, and it uses no additional resources of the server and ESM hosts. For this reason, the approach is sometimes referred to as being resource-free prioritization.

Whether the ESM is in an overloaded state and thus unable to process all of the data packets it is receiving from the agent will depend on the nature of the EDSM implementation. Typically, the ESM can handle some maximum number of data packets efficiently, and this number will vary. As used herein, the notion of the ESM being in an overloaded state refers to the state in which the ESM begins to be (or is) unable to process some configurable percentage of the client requests that it is receiving from the ISA. As noted above, by using the bifurcated channel approach, the data packet(s) comprising the session user information, however, are not impacted because they are delivered to the ESM over the high priority channel.

In one example embodiment, physically the channel can be implemented in association with a separate ESM queue, e.g. a circular queue. Such queue is limited in size, and an overload condition is that number of requests kept in the queue until the queue reaches its maximum size (such that new incoming requests have to override the oldest requests). This example is not intended to be limiting.

The subject matter herein provides numerous advantages. The approach is simple to implement, as all that is required is that the ISA forwards some configurable number of packets from the beginning of the session to the low rate channel instead of forwarding them to the ESM (high rate) queue. The technique works at the time of ESM overload, but it does not otherwise use or require any additional ESM resources. The approach enables the EDSM to effectively retrieve database session information required for security validation even when the ISA and ESM, or both, are overloaded, because during an ESM overload (for example) typically the lost packets are not session login information. This approach thus provides for an improved database access control system that provides consistent security check validations on database queries passed via the intercepting agent. The approach is scalable, and it assures that the ESM can operate efficiently at all times irrespective of load(s) presented by the request and response traffic flows. The approach increases the overall accuracy and throughput of the system significantly, all without requiring additional database server host resources.

Generalizing, the enhanced EDSM functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the agent and EDSM components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the EDSM described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques disclosed herein are not limited to a multi-component transaction processing environment, but this will be a typical implementation. As noted, the above-described function may be used in any system, device, portal, site, or the like wherein server-set session management data might be re-used (either by an original user in a different session, or by another user) through the same client browser.

The session information retrieval technique described herein is not limited for use with any particular database access protocol, and it may be applied in other database access schemes generally. Thus, while the depicted approach is a preferred operating environment, the approach may be implemented in any database access scheme wherein database client requests are processed for potential security violations in the manner described.

Except as otherwise described, the "session information" is not intended to be limited to any particular aspect of the "session."

While the channels as described herein preferably are logical, this is not a limitation, as physical channels may be utilized. Alternatively, any combination of logical and physical routing that distinguishes the high priority packets from the lower priority packets may be utilized provided the ESM can distinguish, store and selectively act on the identified packets so that the high priority packets are acted upon appropriately even in an overload scenario.

There may be more than two channels, as various packets may be afforded different priorities over a range of configurable priorities, although (for the reasons described) the user session information packets are afforded a highest delivery priority.

The techniques herein provide for improvements to another technology or technical field, namely, database access control systems, as well as improvements to the operational capabilities of such systems when used in the manner described.

Having described my invention, what I claim is as follows.

The invention claimed is:

1. A method operative in a database access control system wherein database requests directed from a client to a database server are intercepted by an agent and directed to an external security device for validation against a security policy, comprising:
   configuring first and second channels between the agent and the external security device;
   providing, via the first channel, session user information received from the client;
   providing, via the second channel, session requests received from the client after establishment of a session associated with the session user information; and
   prioritizing processing of packets received over the first channel in lieu of packets received over the second channel when the external security device is operating in an overloaded state.

2. The method as described in claim 1 wherein the first and second channels are logical channels.

3. The method as described in claim 2 wherein the first channel is a high priority, low rate logical channel, and the second channel is a relatively lower priority, high rate logical channel.

4. The method as described in claim 1 wherein a data packet comprising the session user information or a session request is provided over the respective first and second channels by marking the data packet.

5. The method as described in claim 1 wherein a configurable number of data packets comprising the session user information are prioritized for transmission over the first channel to the external security device.

6. The method as described in claim 1 further including establishing a first queue in the external security device that receives and stores the session user information, and establishing a second queue in the external security device that receives and stores the session requests.

7. Apparatus for use in a database access control system wherein database requests directed from a client to a database server are intercepted by an agent and directed to an external security device for validation against a security policy, comprising:
   a processor;
   computer memory holding computer program instructions executed by the processor, the computer program instructions comprising program code configured to:
      establish first and second channels between the agent and the external security device;
      provide, via the first channel, session user information received from the client;
      provide, via the second channel, session requests received from the client after establishment of a session associated with the session user information; and
      prioritize processing of packets received over the first channel in lieu of packets received over the second channel when the external security device is operating in an overloaded state.

8. The apparatus as described in claim 7 wherein the first and second channels are logical channels.

9. The apparatus as described in claim 8 wherein the first channel is a high priority, low rate logical channel, and the second channel is a relatively lower priority, high rate logical channel.

10. The apparatus as described in claim 7 wherein a data packet comprising the session user information or a session request is provided over the respective first and second channels by marking the data packet.

11. The apparatus as described in claim 7 wherein a configurable number of data packets comprising the session user information are prioritized for transmission over the first channel to the external security device.

12. The apparatus as described in claim 7 wherein the computer program instructions are further configured to establish and maintain in the external security device a first queue that receives and stores the session user information, and a second queue that receives and stores the session requests.

13. A computer program product, comprising:
   a non-transitory computer readable medium; and
   computer program instructions held in the non-transitory computer readable medium in association with a database access control system wherein database requests directed by a client to a database server are intercepted by an agent and directed to an external security device for validation against a security policy, the computer program instructions executable by a processor and comprising program code configured to:
      establish first and second channels between the agent and the external security device;
      provide, via the first channel, session user information received from the client;
      provide, via the second channel, session requests received from the client after establishment of a session associated with the session user information; and
      prioritize processing of packets received over the first channel in lieu of packets received over the second channel when the external security device is operating in an overloaded state.

14. The computer program product as described in claim 13 wherein the first and second channels are logical channels.

15. The computer program product as described in claim 14 wherein the first channel is a high priority, low rate logical channel, and the second channel is a relatively lower priority, high rate logical channel.

16. The computer program product as described in claim 13 wherein a data packet comprising the session user information or a session request is provided over the respective first and second channels by marking the data packet.

17. The computer program product as described in claim 13 wherein a configurable number of data packets comprising the session user information are prioritized for transmission over the first channel to the external security device.

18. The computer program product as described in claim 13 wherein the computer program instructions are further configured to establish and maintain in the external security device a first queue that receives and stores the session user information, and a second queue that receives and stores the session requests.

19. A database access control system operated in association with a database client application, and a database server, comprising:
- an agent executed in hardware and configured to intercept a database protocol packet stream as the database client application directs requests to the database server; and
- a security mechanism executed in hardware and configured to receive a database protocol packet that has been forwarded by the agent for validation;
- wherein for a configurable number of packets in the intercepted database protocol packet stream that include session user information associated with initiation of a new session, the agent marks each such database protocol packet and outputs the database protocol packet as marked;
- wherein following processing of the configurable number of packets in the database protocol stream, outputting from the agent one or more follow-on data packets in the database protocol stream;
- wherein the security mechanism prioritizes processing of any marked database protocol packet over a database protocol packet that is not so marked.

\* \* \* \* \*